United States Patent
Rogers et al.

(10) Patent No.: US 8,561,752 B1
(45) Date of Patent: Oct. 22, 2013

(54) POWER STEERING SYSTEMS AND METHODS

(71) Applicants: Jeffrey Allen Rogers, Woodland Park, CO (US); Miguel Angelo Raimao, Colorado Springs, CO (US); Jeffrey T. Gardner, Woodland Park, CO (US)

(72) Inventors: Jeffrey Allen Rogers, Woodland Park, CO (US); Miguel Angelo Raimao, Colorado Springs, CO (US); Jeffrey T. Gardner, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 0 days.

(21) Appl. No.: 13/681,024

(22) Filed: Nov. 19, 2012

Related U.S. Application Data

(62) Division of application No. 12/631,552, filed on Dec. 4, 2009, now Pat. No. 8,312,958.

(60) Provisional application No. 61/119,981, filed on Dec. 4, 2008.

(51) Int. Cl.
  *B62D 5/06* (2006.01)
(52) U.S. Cl.
  USPC ............ 180/421; 180/422; 180/428; 180/441
(58) Field of Classification Search
  USPC .......... 180/417, 421, 422, 423, 428, 441, 442
  See application file for complete search history.

(56) References Cited

U.S. PATENT DOCUMENTS

| | | | |
|---|---|---|---|
| 5,553,683 A | 9/1996 | Wenzel et al. | |
| 5,700,136 A | 12/1997 | Sturman | |
| 5,813,841 A | 9/1998 | Sturman | |
| 6,183,207 B1 | 2/2001 | Sturman | |
| 6,250,416 B1 | 6/2001 | Pluschke et al. | |
| 7,001,158 B2 | 2/2006 | Dunn | |
| 7,185,634 B2 | 3/2007 | Gardner et al. | |
| 7,213,676 B2 | 5/2007 | Soeda et al. | |
| 2009/0159360 A1 | 6/2009 | Kasten et al. | |

*Primary Examiner* — Kevin Hurley
*Assistant Examiner* — Marc A Scharich
(74) *Attorney, Agent, or Firm* — Blakely Sokoloff Taylor & Zafman LLP

(57) ABSTRACT

Power steering systems and methods to improve efficiency and performance of vehicle power steering systems. In one embodiment, there is provided an engine driven positive displacement hydraulic pump, a rotary valve coupled to a steering shaft for receiving hydraulic fluid under pressure in a rotary valve inlet and providing a differential pressure to a steering rack piston for a steering boost responsive to a torque exerted on the steering shaft, valving coupled between an output of the hydraulic pump, the rotary valve inlet and the hydraulic pump input for controllably coupling the output of the hydraulic pump to the rotary valve inlet or an input of the hydraulic pump, and a controller coupled to valving to maintain a flow rate of hydraulic fluid coupled to the rotary valve responsive to a pressure sensor output. Other embodiments are disclosed.

8 Claims, 4 Drawing Sheets

POWER STEERING SYSTEMS AND METHODS

CROSS-REFERENCE TO RELATED APPLICATION

This application is a divisional of U.S. patent application Ser. No. 12/631,552 filed Dec. 4, 2009 which claims the benefit of U.S. Provisional Patent Application No. 61/119,981 filed Dec. 4, 2008.

BACKGROUND OF THE INVENTION

1. Field of the Invention

The present invention relates to the field of power steering systems for motor vehicles.

2. Prior Art

There are three primary types of power steering systems, hydraulic power steering systems, electro-hydraulic power steering systems and electric power steering systems. In a hydraulic power steering system, an engine driven fixed displacement pump is used with a flow control (pressure limiting or relief) valve for moderating system flow and pressure, and a rotary valve for distributing flow to and from the two sides of the rack piston. The rotary valve is responsive to the deflection of a torsion bar type of device on the steering shaft to sense the relative angular deflection between inner and outer valve members. The pump is sized to provide adequate power steering (adequate fluid flow) at engine idle speeds, with the flow through the rotary valve at all engine speeds being maintained at a constant level.

In an electro-hydraulic power steering system, a variable speed electric pump is used for flow control, with a rotary valve of the type used in a hydraulic power steering system being used for distributing flow to and from the two sides of the rack piston.

In a hydraulic power steering system, the pump is oversized for most operating conditions, leading to the excess of power steering fluid flow being dumped by the flow control valve, which wastes most of the pump energy. Also the rotary valve has a substantial short circuit from supply to vent when no power steering force is needed, thus also wasting pump energy. The rack, and thus pump outlet, always has a system-set pressure, even when no steering assist is needed. Thus the pump has to work against this pressure, again wasting pumping energy that is not used for steering assist.

In an electro-hydraulic power steering system, a rotary valve is still employed that also has a substantial short circuit from supply to vent when power assist is not needed, thus wasting pump energy any time steering assist is not active. This system also requires an electric pump, and thus a higher output electrical system on the vehicle.

An electric power steering system requires electric motors for assisting rack motion, and thus also a higher output electrical system on vehicle. It has also been limited to use in smaller vehicles, unless the vehicle electrical system is a full 42 Volt system.

DETAILED DESCRIPTION OF THE PREFERRED EMBODIMENTS

The purpose of the present invention is to supply hydraulic fluid for power steering assist in a much more efficient manner than in the prior art, thereby providing adequate response and assist while substantially reducing energy consumption of the power steering system.

Figure 1:
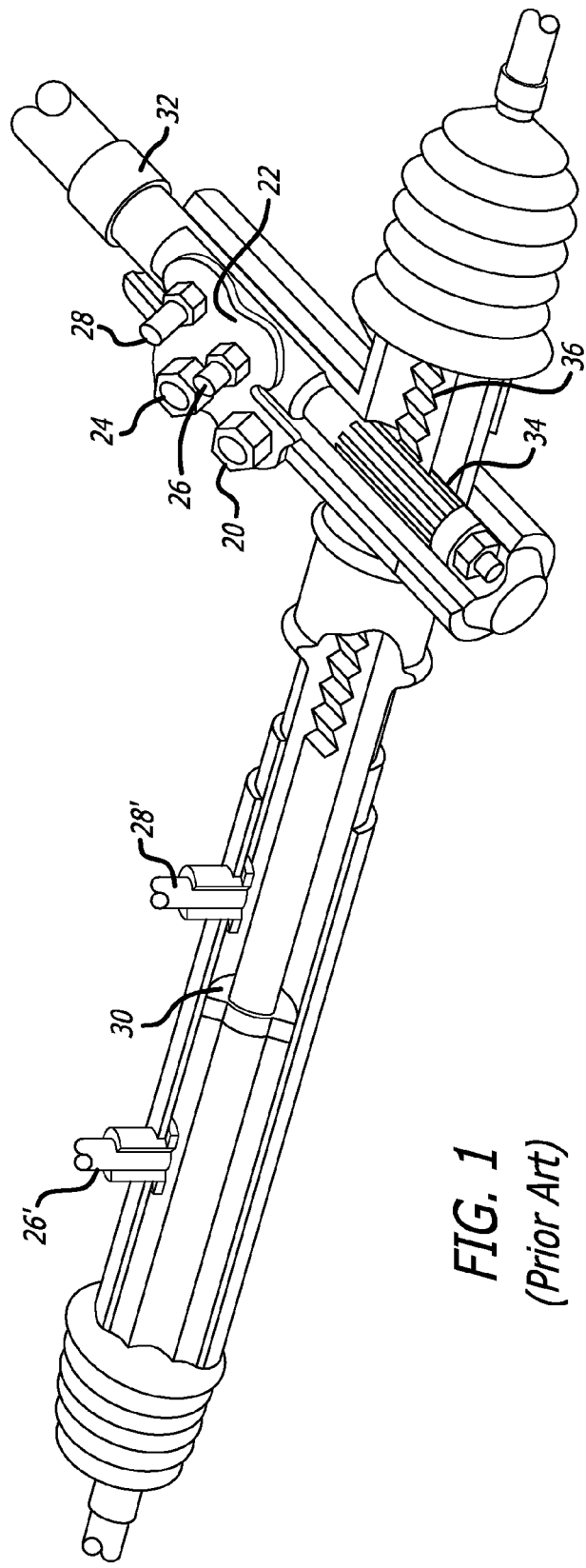
FIG. 1 is a cutaway view of a typical hydraulic power steering system.

First referring to FIG. 1, the general organization of a typical power steering system may be seen. The power steering pump (not shown in FIG. 1) provides power steering fluid under pressure to inlet 24 of a rotary valve within housing 22, with at least some power steering fluid being recirculated back to the pump reservoir through the rotary valve outlet 20 at all times. The rotary valve controls power steering fluid flow to and from a left side port 26 and to and from a right side port 28. The left side port 26 is connected to the left side port 26' on the hydraulic assist and the right side port 28 is connected to the right side port 28' on the hydraulic assist. These two ports on the hydraulic assist control the fluid pressure on each side of a piston 30 in the hydraulic assist unit to provide a left or right force on the tie rod or tie rod assembly coupling the two wheels of the vehicle. A steering shaft 31 (FIG. 2) within a steering column 32 is coupled to the pinion gear 34 through a torsion bar (not shown in FIG. 1), with the pinion 34 driving a rack 36 on the same tie rod shaft as the piston 30 in the hydraulic assist unit. In a typical power steering system, the shaft connected to the steering wheel drives the pinion 34 and one part of the rotary valve through some form of torsion bar or torsion mechanism, with the second part of the rotary valve being connected directly to the shaft coupled to the steering wheel.

Figure 2:
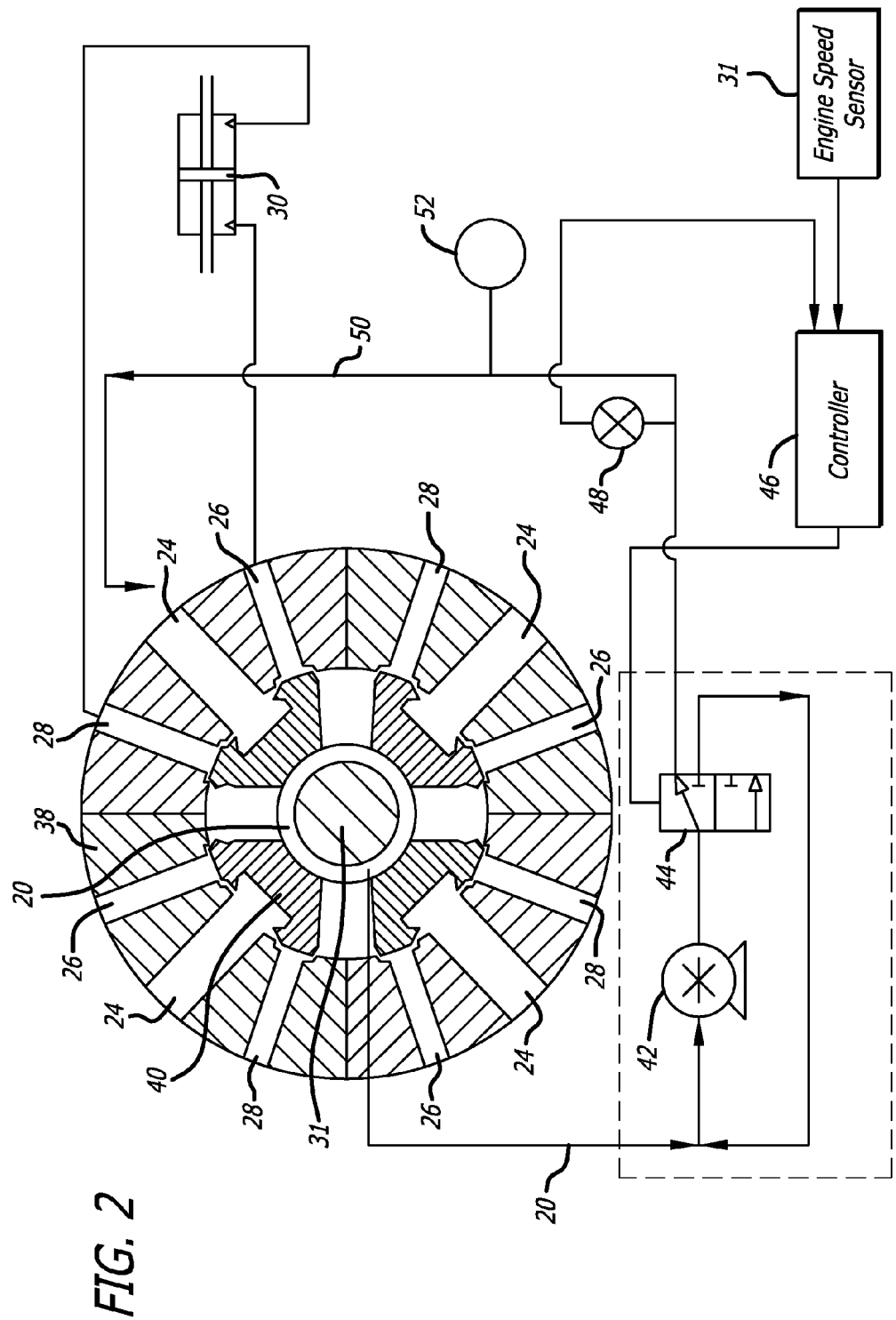
FIG. 2 is a diagram of one embodiment of the present invention.

Essential details of a typical rotary valve may be seen in FIG. 2. This Figure shows aspects of the rotary valve in a single plane, which in a typical rotary valve, would be at other or different axial positions (note the staggered positions along the steering column axis of inlet 24, outlet 20 and left side and right side ports 26 and 28 in FIG. 1).

The rotary valve is comprised of three primary parts, a valve housing, an outer valve member 38 and an inner valve member 40, both of which may rotate within the rotary valve housing and relative to each other. Typically the outer valve member 38 would be driven in rotation within the housing 22 (FIG. 1) directly by the shaft connected to the steering wheel, whereas the inner valve member 40 would be connected to the pinion 34 as driven through the torsion bar. In this way, when there is no power assist needed, the two valves members 38 and 40 line up as shown in FIG. 2, though when power assist is needed to reduce the torque on the steering wheel, there will be an angular deflection of the torsion bar due to that torque, and thus relative rotation between the inner valve member 40 and the outer valve member 38.

In the embodiment shown in FIG. 2, an engine driven pump 42, which may be a prior art pump, pumps fluid to a two-position three-way valve 44 controlled by controller 46 based on a desired flow from the pump to the rotary valve. This flow is controlled by the controller, subject to a predetermined pressure limit based on the measured pressure input from pressure sensor 48 (which alternatively may simply be a pressure relief valve). In alternate embodiments, the controller may also receive an input for control purposes from pressure sensor 48 sensing hydraulic pressure at the rotary valve input.

The desired flow from the pump to the rotary valve is achieved by pulse width modulation of the two-position three-way valve 44 (though the present invention is not limited to the use of pulse width modulation, as pulse rate or other methods of modulation as well as simple on demand control may also be used). The frequency of the two-position three-way valve operation is constant and predetermined based on the actual travel time of the two-position three-way valve and the hydraulic characteristics of the supply lines, rotary valve and power steering assist components downstream of the pump outlet. The percentage of time that the pump flow is switched to the rotary valve (two-position three-way on-time) is adjusted using the measured engine speed from an engine speed sensor 31 and known pump and rotary valve characteristics to achieve the desired flow.

The pump 42, which typically has a fluid reservoir associated therewith, is a positive displacement pump driven by the engine and therefore displaces or pumps a volume of fluid which is engine speed dependent. The two-position three-way valve either couples the output of the pump 42 to line 50, supplying the rotary valve at the desired flow and resulting pressure, or alternatively couples the output of the pump 42 back to the input of the pump 42 against substantially no pressure. Thus pump 42 is pumping against the resulting pressure for the power steering system only the amount of time that is necessary to provide the power steering fluid that is needed, with the additional pump volumetric capacity being merely returned to the pump input or reservoir, preferably through an adequately generous valve and plumbing to minimize flow losses. An optional accumulator 52, such as a conventional accumulator, may be used to limit the cycling rate of valve 44 and the flow and pressure oscillations at the pump outlet.

Since the steering assist assembly is behind the center line of the wheels, pressure on the left side of piston 30 pushes piston 30 to the right to command a left turn, and pressure on the right side of piston 30 pushes piston 30 to the left to command a right turn. While line 50 is illustrated as being coupled to one of ports 24, it in fact would be coupled to all four ports 24, typically through a suitable groove in the housing for the rotary valve 22 (FIG. 1). Similarly, while one of left turn ports 28 is shown coupled to the right side of the rack piston 30, all four of ports 28 would be coupled to the right side. Also, while one of ports 26 is shown coupled to the left side of the rack piston 30, all four of ports 26 are so coupled. As previously mentioned, this porting typically is done at different planes through suitable grooves in the rotary valve housing 22 of FIG. 1. Thus in this arrangement, when there is no torque exerted through the steering wheel, the inner valve member 40 and the outer valve member 38 will align as shown in FIG. 2, though perhaps with both at some angle relative to the reference shown. In this condition, fluid under pressure supplied to the ports 24 will equally provide fluid pressure to ports 28 and 26 so as to provide a balanced pressure on the rack piston 30. In this balanced position, there is still a significant flow path from the pressure inlet ports 24 around the center rotary valve member 40 to the fluid return 20 toward the center, which is returned to the pump inlet or reservoir. Thus there is some fluid flow at pressure when no steering assist is needed. However, when the steering wheel is turned and the wheels do not immediately follow, there will be some relative rotation between the outer valve member 38 and the inner valve member 40 depending on which way the steering wheel was turned, decreasing the fluid path either for ports 26 or ports 28 to the return 20, and doing the opposite for the other of ports 26 and 28, unbalancing the pressure on the rack piston 30 to provide the desired steering assist.

In a typical power steering system the pump 42 is sized to provide adequate steering assist with the engine at idle speed, as one would need for instance while parking when maximum steering assist is needed. However when the vehicle is running on the highway, typical engine speeds will be four or five times as fast as while parking. Also typically at such speeds less steering assist is needed, and in fact, some newer power steering systems reduce the assist at higher vehicle speeds. Thus at all except perhaps idle speed, the engine driven positive displacement pump 42 pumps much more fluid than is necessary, with a flow control and pressure relief valve of the prior art returning the excess fluid to the pump reservoir.

The net result of the combination of FIG. 2 is that the pump only pumps to any significant pressure, the fluid necessary to operate the power steering assist through the rotary valve. Any additional fluid provided by the pump is recirculated back to the pump inlet through the two-position three-way valve 44 at a much lower pressure than the operating pressure needed to supply the rotary valve. The controller adjusts the percentage of time that the two-position three-way valve 44 is in the position to supply fluid to the rotary valve based on the pump speed and pump characteristics to achieve the desired flow. Thus any excess fluid is pumped back to the pump inlet or reservoir, during which time the pump is pumping against a substantially zero output pressure. During this time, the losses in the pump are minimal, as opposed to the prior art wherein at highway speeds, most of the pump energy is lost. This pump loss is a meaningful part of the total engine output, so that the fuel efficiency of the vehicle using the present invention is significantly increased because of the elimination of these losses.

Figure 3:
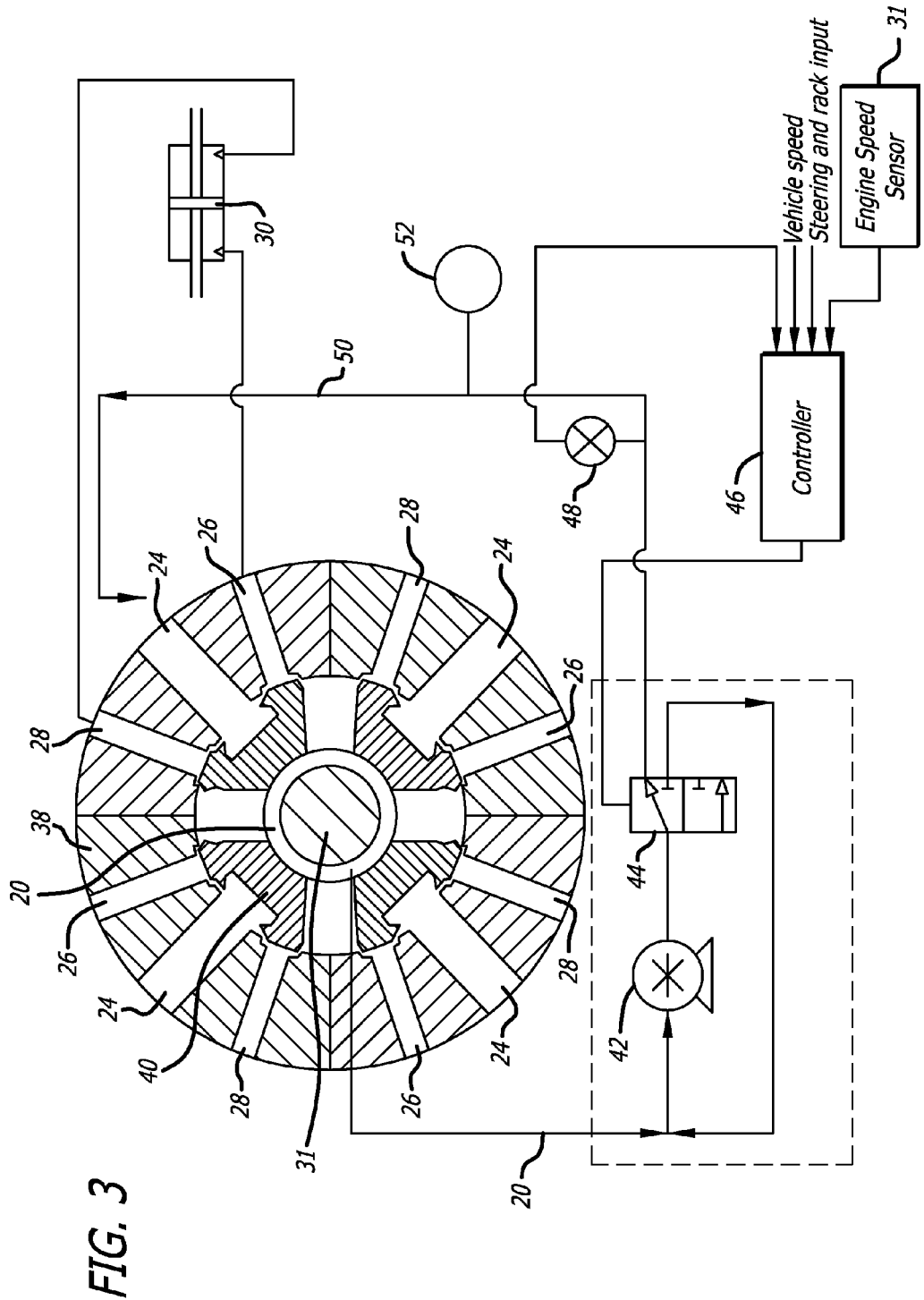
FIG. 3 is a diagram of a second embodiment of the present invention.

Now referring to FIG. 3, another embodiment of the present invention may be seen. This embodiment is similar in many respects to the embodiment of FIG. 2, though in addition uses a controller which controls the amount of flow delivered to the rotary valve, and is also responsive to vehicle speed, engine speed and steering and rack input, i.e., the angular deflection of a torsion bar or equivalent input. These inputs allow a further reduction in system energy loss by allowing the system to operate normally at low vehicle speeds, as under such conditions the rate of steering assist available will depend on pump volumetric capacity, as a typical pump can substantially immediately deliver full volume at full system pressure when needed. Vehicle speed, on the other hand, allows the steering assist to be reduced at higher vehicle speeds by reducing system fluid flow and resulting system operating pressure, again saving additional energy over the typical prior art hydraulic system.

Figure 4:
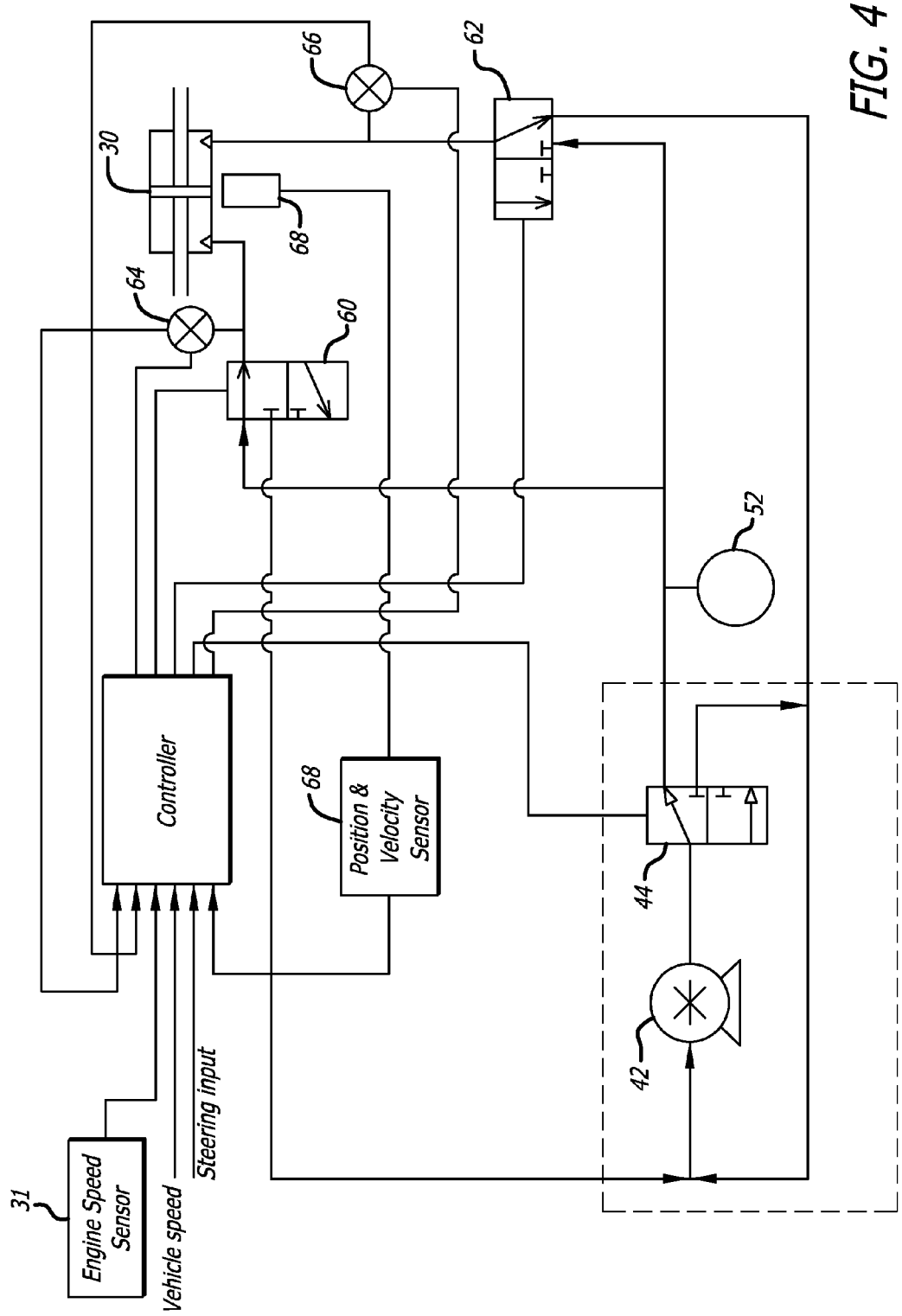
FIG. 4 is a diagram of a third embodiment of the present invention.

FIG. 4 shows still a further embodiment of the invention. In this embodiment the rotary valve is eliminated and replaced by two two-position three-way valves 60 and 62 which control the flow of power steering fluid to and from the left side and right side of the rack piston 30 based on commands from the controller. The controller in turn receives as input both the vehicle speed, for adjusting the amount of assist with vehicle speed, engine speed and steering input, which in this case can be simply the angle of rotation through which the steering wheel has been turned. In response the controller puts out control signals for commanding left side and right side fluid pressures, with pressure sensors 64 and 66 providing feedback to the controller for controlling valves 44, 60 and 62 to provide the desired pressures at the left and right side of the rack piston 30. Alternatively, another pressure sensor may be added for the controller to control valve 44 to maintain the average pressures on the left and right side of the rack piston 30 (i.e., the pressure in the accumulator 52, if an accumulator is used), with the controller controlling the difference between the left side and right side pressures through pressure sensors 64 and 66 and valves 60 and 62. In the embodiment of FIG. 4, a position and velocity sensing system 68 allows the controller to compare the rack piston 30 position and velocity with the steering wheel input position and velocity to control the left side and right side pressures on the rack piston 30 by control of 2 position 3-way valves 60 and 62 to provide the power steering assist.

In this embodiment, vehicle speed may also be input to the controller, which may vary the left and right side pressures with vehicle speed in response to the output of pressure sensors 64 and 66 by controlling the 2 position 3-way valve 44, thereby changing the assist, typically reducing the assist, with vehicle speed. Alternatively, a differential electrical sensor may be used to measure a torsion bar deflection on the shaft connected to the steering wheel and driving the steering rack, the output of the electrical sensor being input to the controller as the steering input for control purposes.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A vehicle power steering unit comprising:
   a steering piston in a hydraulic assist unit to control steering of a vehicle;
   an engine driven positive displacement hydraulic pump having an input and an output;
   an accumulator;
   first valving in hydraulic lines between the output of the hydraulic pump, the accumulator and the hydraulic pump input for controllably coupling the output of the hydraulic pump to the accumulator or the input of the hydraulic pump, the first valving being a two-position three-way valve;
   second valving in hydraulic lines between the accumulator, a first side of the steering piston and the hydraulic pump input for controllably coupling the first side of the steering piston to the accumulator or to the input of the hydraulic pump;
   third valving in hydraulic lines between the accumulator, a second side of the steering piston and the hydraulic pump input for controllably coupling the second side of the steering piston to the accumulator or to the input of the hydraulic pump;
   a steering piston position sensor;
   first and second pressure sensors coupled to the first and second sides of the steering piston, respectively; and
   a controller coupled to the first and second pressure sensors, the steering piston position sensor, the first, second and third valving, the controller controlling the first valving to maintain a hydraulic pressure in the accumulator and to return additional hydraulic pump capacity to the hydraulic pump input, and to control the second and third valving to provide a differential pressure across the steering piston responsive to a steering input.

2. The vehicle power steering unit of claim 1 wherein the vehicle has a steering shaft configured to be coupled to a steering wheel, and wherein the controller is also responsive to speed of an engine in the vehicle, vehicle speed, steering shaft position and steering piston position.

3. The vehicle power steering unit of claim 2 wherein the controller is also responsive to a steering shaft velocity and to steering piston velocity.

4. The vehicle power steering unit of claim 1 wherein the second and third valving are each two-position three-way valves.

5. The vehicle power steering unit of claim 1 wherein the controller is also responsive to speed of an engine in the vehicle.

6. The vehicle power steering unit of claim 1 wherein the controller is also responsive to vehicle speed.

7. The vehicle power steering unit of claim 1 wherein the vehicle has a steering shaft configured to be coupled to a steering wheel, and wherein the controller is responsive to a steering shaft position and steering shaft velocity as the steering input, and is also responsive to steering piston position and steering piston velocity.

8. The vehicle power steering unit of claim 1 wherein the vehicle has a steering shaft configured to be coupled to a steering wheel, and wherein the steering input is responsive to an electrical sensor sensing a deflection of a torsion bar.

* * * * *